United States Patent
Ujimoto et al.

(10) Patent No.: US 8,754,339 B2
(45) Date of Patent: Jun. 17, 2014

(54) SLIDE SWITCH

(75) Inventors: Takushi Ujimoto, Fuchu-cho (JP);
Hiroshi Nakahira, Fuchu-cho (JP);
Mizuho Ueta, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 588 days.

(21) Appl. No.: 13/096,267

(22) Filed: Apr. 28, 2011

(65) Prior Publication Data

US 2011/0278142 A1    Nov. 17, 2011

(30) Foreign Application Priority Data

May 13, 2010    (JP) .................................. 2010-110977

(51) Int. Cl.
*H01H 13/00*    (2006.01)
*H01H 15/00*    (2006.01)

(52) U.S. Cl.
USPC ........................................................ 200/16 A

(58) Field of Classification Search
USPC ................................................. 200/16 A, 1 B
See application file for complete search history.

(56) References Cited

U.S. PATENT DOCUMENTS

| | | | |
|---|---|---|---|
| 4,897,513 A | 1/1990 | Oka et al. | |
| 4,904,828 A | 2/1990 | Lipp et al. | |
| 6,518,525 B1 | 2/2003 | Anastasia et al. | |
| 7,030,326 B2 * | 4/2006 | Wilsser | 200/16 A |
| 2006/0260925 A1 | 11/2006 | Niiyama | |

FOREIGN PATENT DOCUMENTS

| | | |
|---|---|---|
| JP | 54-119664 | 8/1979 |
| JP | 2-56324 | 4/1990 |
| JP | 8-233078 | 9/1996 |

* cited by examiner

*Primary Examiner* — R S Leubke
*Assistant Examiner* — Lheiren Mae Caroc
(74) *Attorney, Agent, or Firm* — Gerlad E. Hespos; Michael J. Porco; Matthew T. Hespos

(57) ABSTRACT

A slide switch has a first small-current fixed contact, a second small-current fixed contact, a first large-current fixed contact and a second large-current fixed contact all disposed on a board. A movable contact member is movable along the board and includes a first small-current movable contact, a second small-current movable contact, a first large-current movable contact and a second large-current movable contact, all of which are integrally formed together. The first small-current movable contact is adapted, according to the movement of the movable contact member, to be brought into contact with the first small-current fixed contact. The first large-current movable contact is adapted, according to the movement of the movable contact member, to contact the first large-current fixed contact. The second small-current movable contact is continually in contact with the second small-current fixed contact. The second large-current movable contact is continually in contact with the second large-current fixed contact.

3 Claims, 3 Drawing Sheets

SLIDE SWITCH

BACKGROUND OF THE INVENTION

1. Field of the Invention

The present invention relates to a slide switch.

2. Description of the Related Art

Heretofore, there has been known a key interlock system which is designed, when a shift lever of a shifter mechanism of an automatic transmission vehicle is in a position other than a P (Parking) range position, to make it unable to pull out an engine key from a key cylinder even if the key is turned to a LOCK position (or OFF position) (see JP 8-233078A).

As illustrated in FIG. 3A, in the conventional key interlock system, a slide switch 2(A) is adapted to be set to an ON state in a manner interlocked with an operation of moving a shift lever 1 to a P range position, to thereby cause a key pull-out preventing solenoid 3 to be set to an ON state. This makes it possible to pull out an engine key 4 from a key cylinder 5. In this type of key interlock system, a large current (several hundred mA, e.g., 400 to 700 mA) is applied to the slide switch 2(A) to set the solenoid 3 to the ON state. Thus, the slide switch 2(A) is required to have a switch structure suitable for large current.

Meanwhile, in late years, a keyless engine starting system has been employed which is designed to allow an engine to be started without using the above mechanical engine key. In the keyless engine starting system, a driver can start the engine by sending a signal to the system from a signal transmitter section, such as a card carryable by the driver, and then performing a simple operation, such as an operation of turning a start switch.

For an emergency situation where no signal is transmitted from the signal transmitter section such as the card, due to battery exhaustion or the like, the keyless engine starting system comprises a simple engine key 4 as an adjunct to the card or the like. The driver can start the engine by turning this engine key 4 after inserting it into a key cylinder 5. In the keyless engine starting system, as shown in FIG. 3B, a slide switch 2(B) is adapted to be set to an ON state in an interlocked manner with the operation of moving the shift lever 1 to the P range position, to thereby cause the solenoid 3 to be set to the ON state through a switching element 7. This makes it possible to pull out the engine key 4 from the key cylinder 5.

Instead of playing a roll in directly setting the solenoid 3 to the ON state as in the slide switch 2(A) in the former type of key interlock system, the slide switch 2(B) in the latter type of key interlock system plays only a roll in outputting an ON signal to the switching element 7 via an ECU (Electric Control Unit) 6. Thus, in the latter type of key interlock system, a small current (a few mA to several ten mA, e.g., 3 to 10 mA) is applied to the slide switch 2(B) to indirectly set the solenoid 3 to the ON state. Thus, the slide switch 2(B) is required to have a switch structure suitable for small current.

If a small current is applied to the large-current slide switch 2(A), a contact failure between switch contacts is likely to occur due to an oxide film or the like. If a large current is applied to the small-current slide switch 2(B), switch contacts are likely to degrade due to arc discharge. Therefore, as the slide switch designed to be interlocked with the shifter mechanism, it is necessary for a vehicle having the former type of key interlock system to employ the large-current slide switch 2(A), and it is necessary for a vehicle having the latter type of key interlock system to employ the small-current slide switch 2(B).

However, in cases where the large-current slide switch 2(A) and the small-current slide switch 2(B) are selectively used depending on the types of key interlock systems, an operation of installing the slide switch will become complicated. Moreover, there is a risk that an operator wrongly selects the type of slide switch to be installed. Further, it is necessary to produce and manage the two types of slide switches, which leads to an increase in cost.

SUMMARY OF THE INVENTION

In view of the above problems, it is therefore an object of the present invention to provide a slide switch capable of suppressing the occurrence of a problem with switch functions even if it is used in both a key interlock system where a large current is applied thereto and a key interlock system where a small current is applied thereto.

In order to achieve the object, the present invention provides a slide switch which comprises: a board; a first small-current fixed contact disposed on the board; a second small-current fixed contact disposed on the board; a first large-current fixed contact disposed on the board and electrically connected to the first small-current fixed contact; a second large-current fixed contact disposed on the board and electrically connected to the second small-current fixed contact; and a movable contact member movable along the board, wherein the movable contact member includes a first small-current movable contact, a second small-current movable contact, a first large-current movable contact and a second large-current movable contact, and wherein all of the movable contacts are integrally formed together. The first small-current movable contact is adapted, according to the movement of the movable contact member, to be brought into contact with the first small-current fixed contact. The first large-current movable contact is adapted, according to the movement of the movable contact member, to be brought into contact with the first large-current fixed contact. The second small-current movable contact is continually in contact with the second small-current fixed contact. The second large-current movable contact is continually in contact with the second large-current fixed contact.

BRIEF DESCRIPTION OF THE DRAWINGS

FIGS. 1A and 1B are top plan views illustrating a slide switch according to one embodiment of the present invention, wherein FIG. 1A illustrates the slide switch in an OFF state, and FIG. 1B illustrates the slide switch in an ON state.

DETAILED DESCRIPTION OF THE PREFERRED EMBODIMENTS

Figure 1A:
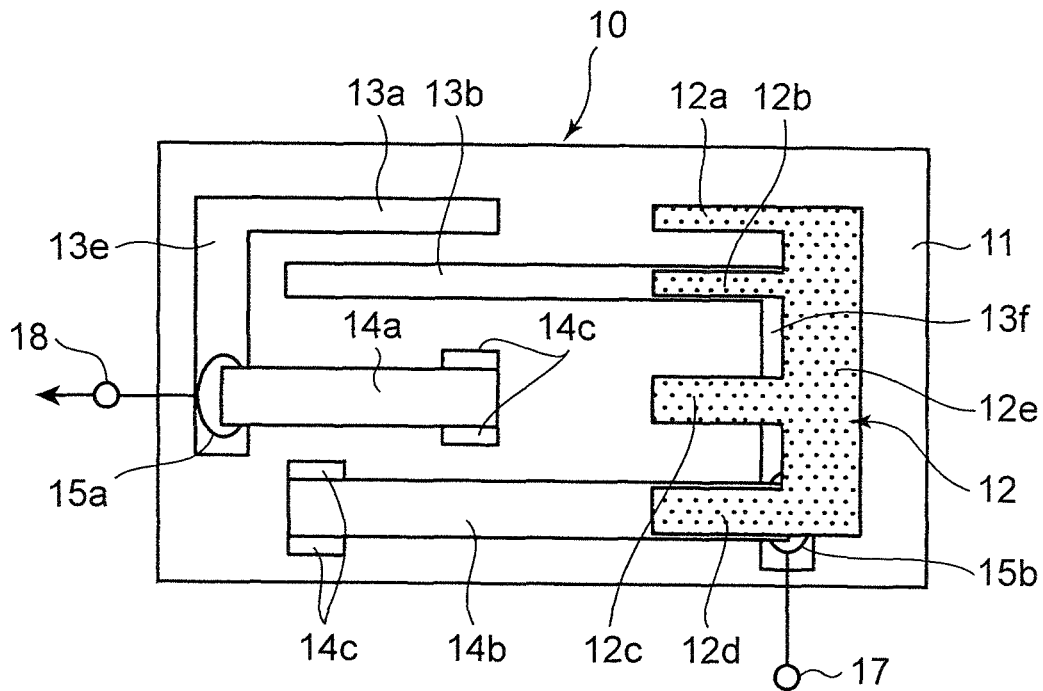

With reference to the drawings, a slide switch 10 according to one embodiment of the present invention will now be specifically described. As illustrated in FIGS. 1A, 1B, 2A and 2B, the slide switch 10 comprises a rectangular-shaped board 11, a fixed contact disposed on a surface of the board 11, and a movable contact member 12 slidingly movable along the board 11 and the fixed contact.

The fixed contact includes a pair of small-current fixed contacts (a first small-current fixed contact 13a and a second small-current fixed contact 13b), and a pair of large-current fixed contacts (a first large-current fixed contact 14a and a second large-current fixed contact 14b). In FIGS. 1A to 2B, dots are assigned to the movable contact member 12 to facilitate visualizing a relationship with each of the fixed contacts 13a, 13b, 14a, 14b.

Each of the small-current fixed contacts 13a, 13b is formed by printing a wiring pattern on a surface of the board 11. The small-current fixed contacts 13a, 13b are disposed on the surface of the board 11 to extend in a direction along a longitudinal direction of the board 11 in spaced-apart relation to each other. The small-current fixed contacts 13a, 13b are provided on the surface of the board 11 in a region offset on one side in a widthwise direction perpendicular to the longitudinal direction of the board 11 (in FIG. 1A, an upper region). The respective extending directions of the small-current fixed contact 13a and the small-current fixed contact 13b are parallel to each other.

Each of the large-current fixed contacts 14a, 14b is a conductor plate (e.g., steel plate) fixed onto the surface of the board 11. The large-current fixed contacts 14a, 14b are disposed on the surface of the board 11 to extend in a direction along the longitudinal direction of the board 11 in spaced-apart relation to each other. The large-current fixed contacts 14a, 14b are provided on the surface of the board 11 in a region offset on the other side in the widthwise direction of the board 11 (in FIG. 1A, a lower region). The respective extending directions of the large-current fixed contact 14a and the large-current fixed contact 14b are parallel to each other.

The large-current fixed contact 14a is electrically connected to the small-current fixed contact 13a. More specifically, a first connection circuit 13e is formed by printing a wiring pattern on the surface of the board 11, in such a manner that it connects to one end (in FIG. 1A, a left end) of the small-current fixed contact 13a and extends from the one end of the small-current fixed contact 13a toward one side in the widthwise direction of the board 11 (in FIG. 1A, in a downward direction). One end (in FIG. 1A, a left end) of the large-current fixed contact 14a is joined to the connection circuit 13e by a solder 15a.

Figure 2A:
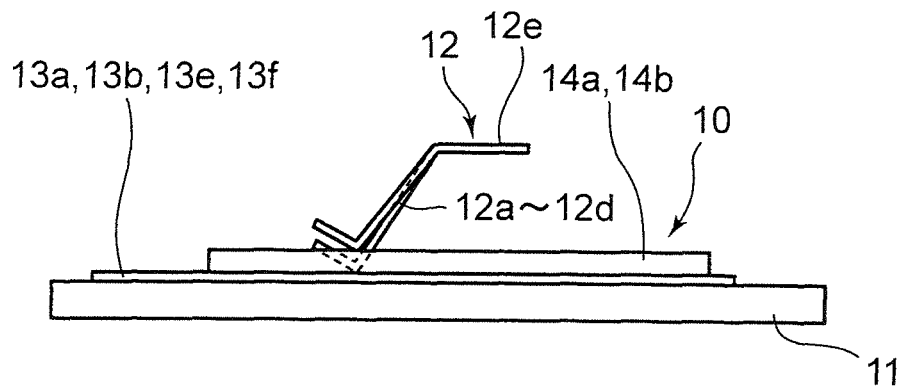
FIG. 2A is a front view of the slide switch illustrated in FIG. 1B.
Figure 2B:
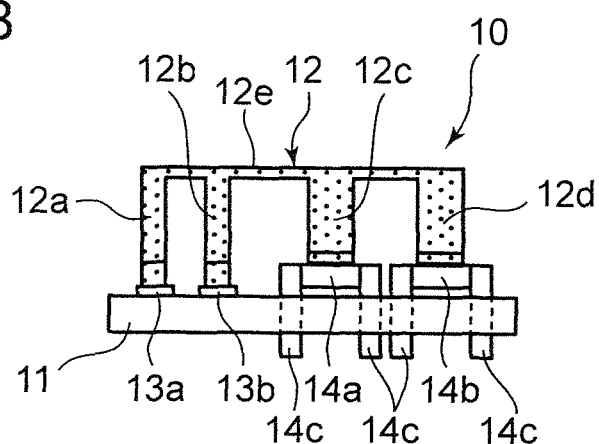
FIG. 2B is a side view of the slide switch illustrated in FIG. 1B.

As illustrated in FIGS. 1A and 2B, the large-current fixed contact 14a has a bent portion 14c provided at the other end (in FIG. 1A, a right end) thereof to extend toward the board 11. The bent portion 14c is inserted into a non-illustrated hole provided in the board 11 to allow the large-current fixed contact 14a to be positioned with respect to the board 11.

The large-current fixed contact 14b is electrically connected to the small-current fixed contact 13b. More specifically, a second connection circuit 13f is formed by printing a wiring pattern on the surface of the board 11, in such a manner that it connects to one end (in FIG. 1A, a right end) of the small-current fixed contact 13b and extends from the one end toward one side in the widthwise direction of the board 11 (in FIG. 1A, in the downward direction). One end (in FIG. 1A, a right end) of the large-current fixed contact 14b is joined to the connection circuit 13f by a solder 15b.

As illustrated in FIGS. 1A and 2B, the large-current fixed contact 14b has a bent portion 14c provided at the other end (in FIG. 1A, a left end) thereof to extend toward the board 11, and another bent portion 14c provided adjacent to the one end thereof in the same manner. Each of the bent portions 14c, 14c is inserted into a non-illustrated hole provided in the board 11 to allow the large-current fixed contact 14b to be positioned with respect to the board 11.

The movable contact member 12 is a member in which a pair of small-current movable contacts (a first small-current movable contact 12a and a second small-current movable contact 12b), a pair of large-current movable contacts (a first large-current movable contact 12c and a second large-current movable contact 12d), and a joining portion 12e for joining the four movable contacts 12a to 12d, are integrally formed together.

The joining portion 12e is provided to extend in the widthwise direction of the board 11, as illustrated in FIG. 1A, at a position farther away from the board 11 than the movable contacts 12a to 12d, as illustrated in FIG. 2A. Each of the movable contacts 12a to 12d extends from the joining portion 12e in a direction along the longitudinal direction of the board 11 (in FIG. 1A, a leftward direction). The respective extending directions of the movable contacts 12a to 12d are parallel to each other. The movable contacts 12a, 12b, 12c, 12d are arranged side-by-side in the widthwise direction of the board 11 in this order. As measured in the widthwise direction of the board 11 (in FIG. 1A, an upward-downward direction), the movable contact 12a is located at approximately the same position as the position of the fixed contact 13a, the movable contact 12b is located at approximately the same position as the position of the fixed contact 13b, the movable contact 12c is located at approximately the same position as the position of the fixed contact 14a, the movable contact 12d is located at approximately the same position as the position of the fixed contact 14b. The extending direction of each of the fixed contacts 13a, 13b, 14a, 14b and the extending direction of a respective one of the movable contacts 12a, 12b, 12c, 12d are parallel to each other.

One end (in FIG. 1A, a right end) of each of the movable contacts connects to the joining portion 12e, and each of the movable contacts extends obliquely downwardly from the one end thereof. The other end of each of the movable contacts is bent into a V shape. A lower edge of the bent portion in each of the movable contacts is a region to be brought into contact with a corresponding one of the fixed contacts. Each of the movable contacts has resiliency, so that the other end of the movable contact can be displaceable in an upward-downward direction in FIG. 2A about a supporting point defined by the one end thereof connecting to the joining portion 12e. Thus, during a sliding movement of the movable contact member 12, each of the movable contacts 12a to 12d is resiliently displaced up and down in response to a step between the board 11 and a corresponding one of the fixed contacts, so that it becomes possible to achieve an excellent contact state with the corresponding fixed contact.

Each of the small-current fixed contact 13a and the small-current fixed contact 13b has a width less than that of each of the large-current fixed contact 14a and the large-current fixed contact 14b. Each of the small-current movable contact 12a and the small-current movable contact 12b has a width less than that of each of the large-current movable contact 12c and the large-current movable contact 12d. In other words, each of the small-current fixed contacts 13a, 13b and the small-current movable contacts 12a, 12b is designed to have a volume which permits a small current (e.g., 3 to 10 mA) to flow therethrough. Each of the large-current fixed contacts 14a, 14b and the large-current movable contacts 12c, 12d is designed to have a volume which permits a large current (e.g., 400 to 700 mA) to flow therethrough.

The movable contact member 12 is supported by the board 11, in a manner slidingly movable in a direction parallel to the extending direction of each of the fixed contacts (the longitudinal direction of the board 11). Thus, when the movable contact member 12 is slidingly moved in one direction, the lower edge of the bent portion of the movable contact 12a is brought into contact with the fixed contact 13a, so that the movable contact 12a and the fixed contact 13a are placed into an electrically connected state. On the other hand, when the movable contact member 12 is slidingly moved in the opposite direction, the lower edge of the bent portion of the movable contact 12a is separated from the fixed contact 13a, so that the movable contact 12a and the fixed contact 13a are placed into an electrically disconnected state.

Further, when the movable contact member 12 is slidingly moved in the one direction, the lower edge of the bent portion of the movable contact 12c is brought into contact with the fixed contact 14a, so that the movable contact 12c and the fixed contact 14a are placed into an electrically connected state. On the other hand, when the movable contact member 12 is slidingly moved in the opposite direction, the lower edge of the bent portion of the movable contact 12c is separated from the fixed contact 14a, so that the movable contact 12c and the fixed contact 14a are placed into an electrically disconnected state.

As measured in the sliding movement direction of the movable contact member 12, each of the fixed contacts 13b, 14b has a length greater than that of each of the fixed contacts 13a, 14a, so that it is in contact with a corresponding one of the movable contacts 12b, 12d even after the movable contact member 12 is slidingly moved maximally in the opposite direction. Thus, even if the movable contact member 12 is displaced along with the sliding movement, the movable contact 12b is continually in contact with the fixed contact 13b, and the movable contact 12d is continually in contact with the fixed contact 14b.

Figure 2C:
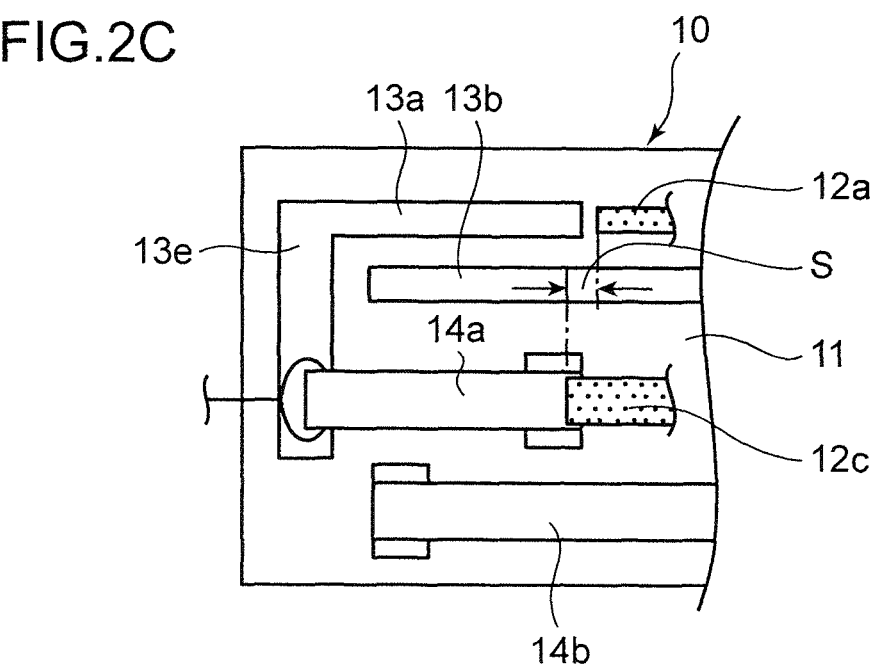
FIG. 2C is a top plan view illustrating a contact timing between a movable contact and a fixed contact.

As illustrated in FIG. 2C, a contact timing during a course of the sliding movement of the movable contact member 12 may be set such that the movable contact 12c is brought into contact with the fixed contact 14a before the movable contact 12a is brought into contact with the fixed contact 13a.

More specifically, a distance between the other end (in FIG. 2C, left end) of the movable contact 12c and the fixed contact 14a is less than a distance between the other end (in FIG. 2C, left end) of the movable contact 12a and the fixed contact 13a. In the example illustrated in FIG. 2C, the other end of the movable contact 12c is located offset by a distance S in the one direction, with respect to the other end of the movable contact 12a. Further, the right end of the fixed contact 13a and the right end of the fixed contact 14a are located at approximately the same position in the sliding movement direction.

Normally, it is ideal that the contact timing between the small-current contacts 13a, 12a and the contact timing between the large-current contacts 14a, 12c are set to coincide with each other. However, in cases where the slide switch 10 is used as the large-current switch illustrated in FIG. 3A, as described later, if the slide switch 10 is designed such that the small-current contacts 13a, 12a come into contact with each other before the contact between the large-current contacts 14a, 12c, an arc discharge is likely to occur therebetween. Therefore, as means to suppress the occurrence of such an arc discharge, the configuration illustrated in FIG. 2C may be employed. In this case, during a course of the movement of the movable contact member 12 in the one direction, the movable contact 12c can be brought into contact with the fixed contact 14a before the movable contact 12a is brought into contact with the fixed contact 13a.

(Operation of Slide Switch)

An operation of the slide switch 10 according to this embodiment will be described by taking, as examples, the key interlock systems illustrated in FIGS. 3A and 3B, wherein the slide switch 10 is used as substitute for each of the conventional slide switches 2(A), 2(B). In the systems illustrated in FIGS. 3A and 3B, components other than the slide switch 10 are the same as those described in the Background Art, and their detailed description will be omitted.

Figure 3A:
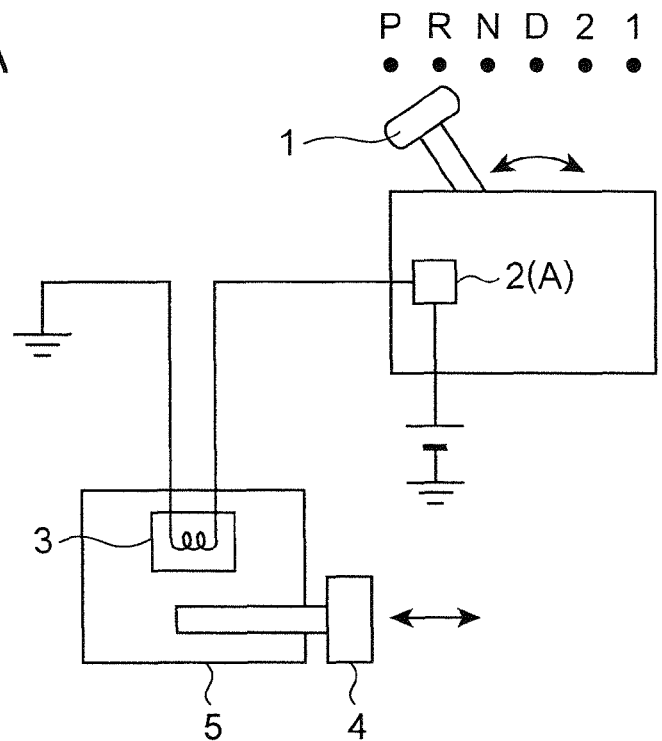
FIGS. 3A and 3B are block diagrams illustrating two types of key interlock systems.
Figure 3B:
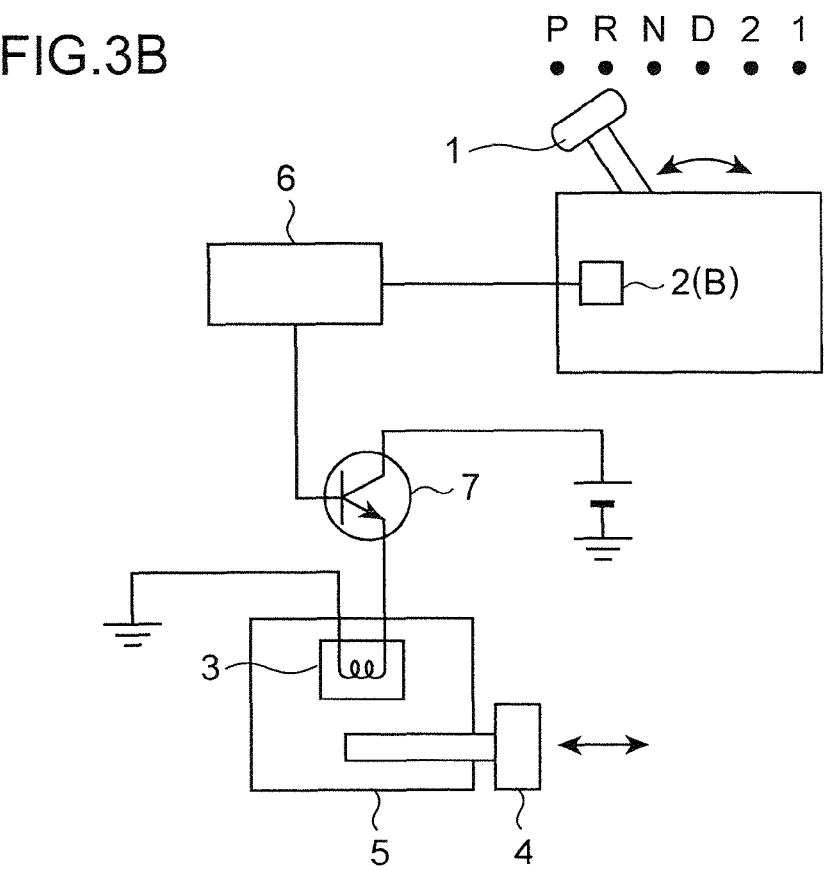

In the systems illustrated in FIGS. 3A and 3B, the slide switch 10 is set to the ON state in a manner interlocked with the operation of moving the shift lever 1 of the shifter mechanism of the automatic transmission vehicle to the P (Parking) range position. Specifically, the movable contact member 12 of the slide switch 10 is slidingly moved from the OFF state illustrated in FIG. 1A to the ON state illustrated in FIG. 1B in a manner interlocked with the operation of moving the shift lever 1 to the P range position. According to the sliding movement, the movable contact 12c is brought into contact with the fixed contact 14a, and the movable contact 12a is brought into contact with the fixed contact 13a.

Figure 1B:
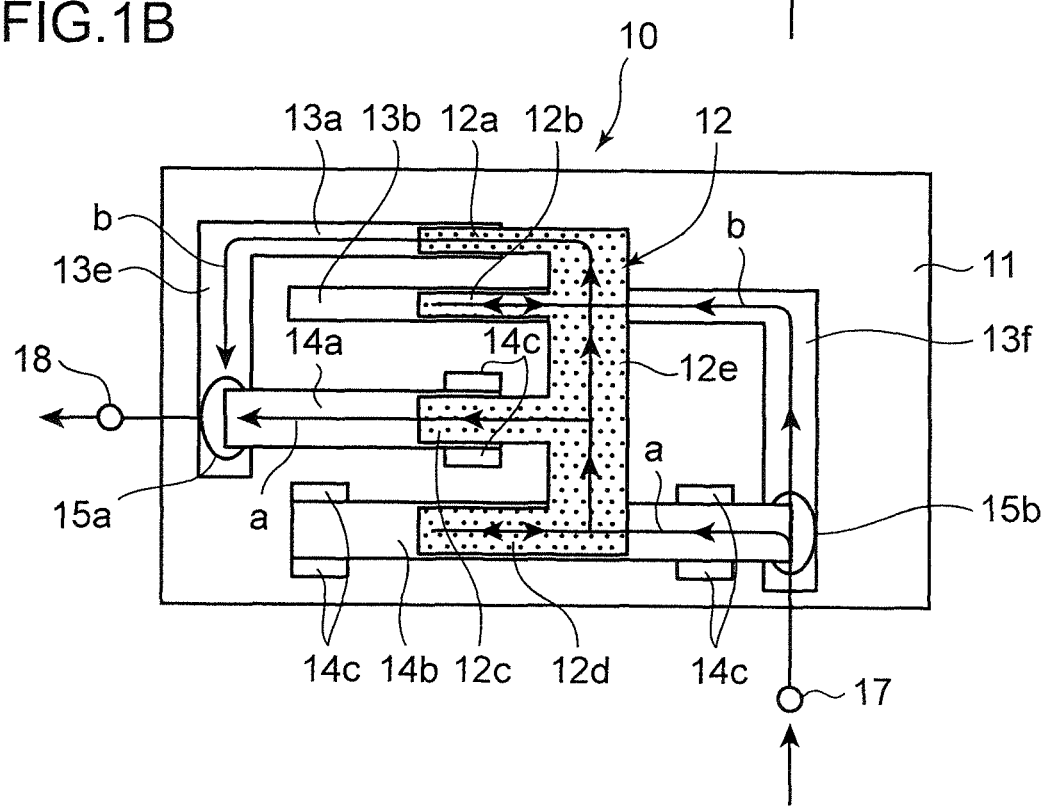

In the system illustrated in FIG. 3A, a large current for setting the solenoid 3 to the ON state flows through the slide switch 10 in the following order: "an input terminal 17"; "the large-current fixed contact 14b and the small-current fixed contact 13b"; "the large-current movable contact 12d and the small-current movable contact 12b"; "the large-current movable contact 12c and the small-current movable contact 12a"; "the large-current fixed contact 14a and the small-current fixed contact 13a"; and "an output terminal 18", as illustrated in FIG. 1B.

As above, when the slide switch 10 is used as a large-current slide switch, a large current flows both between the large-current fixed contact 14a and the large-current movable contact 12c and between the small-current fixed contact 13a and the small-current movable contact 12a. In this case, even if the small-current fixed contact 13a and the small-current movable contact 12a undergo gradual degradation due to an arc discharge caused by the large current flowing between the small-current contacts 13a, 12a, no problem occurs in a required switch function, because the small-current contacts 13a, 12a are not used (not required).

In the system illustrated in FIG. 3B, a small current for setting the switching element 7 to an ON state flows through the slide switch 10 in the following order: "the input terminal 17"; "the large-current fixed contact 14b and the small-current fixed contact 13b"; "the large-current movable contact 12d and the small-current movable contact 12b"; "the large-current movable contact 12c and the small-current movable contact 12a"; "the large-current fixed contact 14a and the small-current fixed contact 13a"; and "the output terminal 18", as illustrated in FIG. 1B.

As above, when the slide switch 10 is used as a small-current slide switch, a small current flows both between the large-current fixed contact 14a and the large-current movable contact 12c and between the small-current fixed contact 13a and the small-current movable contact 12a. In this case, even if a contact failure between the large-current fixed contact 14a and the large-current movable contact 12c occurs due to an oxide film or the like, no problem occurs in a required switch function, because the large-current contacts 14a, 12c are not used (not required).

As mentioned above, in the slide switch according to this embodiment, no problem occurs in a required switch function, irrespective of whether it is used as a large-current slide switch or a small-current slide switch. Thus, when the slide switch 10 is used as a switch designed to be interlocked with the operation of moving the shift lever 1 of the shifter mechanism of the automatic transmission vehicle, it is not necessary to selectively use a large-current slide switch and a small-current slide switch depending on the types of key interlock systems. This makes it possible to eliminate complexity due to a need to selectively use different types of slide switches. In addition, it becomes possible to avoid the risk that an operator wrongly selects the type of slide switch for use in each of the key interlock systems. Further, it is not necessary to produce and manage the two types of slide switches 2(A), 2(B) as in the conventional manner, so that it becomes possible to facilitate a reduction in cost.

In this embodiment, the small-current fixed contacts 13a, 13b and the connection circuits 13e, 13f can be formed by printing a wiring pattern on the board 11, and the large-current fixed contacts 14a, 14b can be formed by fixing a conductor plate (steel plate) onto the board 11, so that it becomes possible to utilize existing forming techniques and reduce a component cost.

When the slide switch 10 is used as a switch designed to be interlocked with the operation of moving the shift lever 1 of the shifter mechanism of the automatic transmission vehicle to the P range position, it can be desirably employed in both an engine starting system essentially using the engine key 4 and a keyless engine starting system using the engine key 4 only in emergency situations.

The slide switch 10 according to this embodiment is not limited to a type designed to be set to an ON state in a manner interlocked with the operation of moving the shift lever 1 to the P range position. For example, it is usable as a shift up/down switch in a D (Drive) range of the shift lever 1. Furthermore, the slide switch 10 is usable as a slide switch for various other fields.

Outline of the Embodiment

The embodiment can be summarized as follows.

(1) A slide switch according to the above embodiment is configured such that, according to a movement of a movable contact member, a first small-current movable contact is brought into contact with a first small-current fixed contact, and a first large-current movable contact is brought into contact with a first large-current fixed contact, whereby a current flows both between the first large-current fixed contact and the first large-current movable contact and between the first small-current fixed contact and the first small-current movable contact.

When the slide switch is used as a large-current slide switch, a required switch function is carried out by the first large-current fixed contact and the first large-current movable contact. After the slide switch is installed in a system as a large-current slide switch, it will never be used as a small-current slide switch. Thus, even if the first small-current fixed contact and the first small-current movable contact undergo gradual degradation due to an arc discharge caused by a large current flowing between the first small-current fixed contact and the first small-current movable contact, no problem occurs in a function required for a large-current slide switch.

When the slide switch is used as a small-current slide switch, a required switch function is carried out by the first small-current fixed contact and the first small-current movable contact. After the slide switch is installed in a system as a small-current slide switch, it will never be used as a large-current slide switch. Thus, even if a contact failure between the first large-current fixed contact and the first large-current movable contact occurs due to an oxide film or the like when a small current flows between the first large-current fixed contact and the first large-current movable contact, no problem occurs in a function required for a small-current slide switch.

(2) The above slide switch may be designed such that, during a course of the movement of the movable contact member, the first large-current movable contact is brought into contact with the first large-current fixed contact before the first small-current movable contact is brought into contact with the first small-current fixed contact.

In this case, when the slide switch is used as a large-current slide switch, the first large-current movable contact is brought into contact with the first large-current fixed contact before the contact between the first small-current movable contact and the first small-current fixed contact, so that it becomes possible to suppress the occurrence of an arc discharge between the first small-current movable contact and the first small-current fixed contact.

(3) Preferably, the above slide switch further comprises a first connection circuit electrically connecting the first small-current fixed contact to the first large-current fixed contact, and a second connection circuit electrically connecting the second small-current fixed contact to the second large-current fixed contact, wherein: each of the first small-current movable contact and the second small-current movable contact has a width less than that of each of the first large-current movable contact and the second large-current movable contact; each of the first small-current fixed contact, the second small-current fixed contact, the first connection circuit and the second connection circuit, is a printed wiring pattern formed on a board; and each of the first large-current fixed contact and the second large-current fixed contact is a conductor plate fixed onto the board.

In this case, the small-current fixed contacts and the connection circuits can be formed as a printed board, and the large-current fixed contacts can be formed simply by fixing the conductor plate onto the printed board, so that it becomes possible to utilize existing forming techniques and reduce a component cost.

(4) As a specific example of application, the above slide switch may be designed to be interlocked with an operation of moving a shift lever of a shifter mechanism of an automatic transmission vehicle to a parking range position, wherein the movable contact member is adapted to be moved in a manner interlocked with the operation, to allow the first large-current movable contact and the first small-current movable contact to be brought into contact with the first large-current fixed contact and the first small-current fixed contact, respectively.

In this case, the above slide switch can be desirably employed in both an engine starting system essentially using an engine key and a keyless engine starting system using the engine key only in emergency situations.

This application is based on Japanese Patent application No. 2010-110977 filed in Japan Patent Office on May 13, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A slide switch comprising:
a board;
a first small-current fixed contact disposed on the board;
a second small-current fixed contact disposed on the board;
a first large-current fixed contact disposed on the board and electrically connected to the first small-current fixed contact;

a second large-current fixed contact disposed on the board and electrically connected to the second small-current fixed contact;
a first connection circuit electrically connecting the first small-current fixed contact to the first large-current fixed contact; and
a second connection circuit electrically connecting the second small-current fixed contact to the second lame-current fixed contact; and
a movable contact member movable along the board, the movable contact member including a first small-current movable contact, a second small-current movable contact, a first large-current movable contact and a second large-current movable contact, all of the movable contacts being integrally formed together,
wherein:
the first small-current movable contact is adapted, according to a movement of the movable contact member, to be brought into contact with the first small-current fixed contact;
the first large-current movable contact is adapted, according to the movement of the movable contact member, to be brought into contact with the first large-current fixed contact;
the second small-current movable contact is continually in contact with the second small-current fixed contact;
the second large-current movable contact is continually in contact with the second large-current fixed contact;
each of the first small-current movable contact and the second small-current movable contact has a width less than that of each of the first large-current movable contact and the second large-current movable contact;
each of the first small-current fixed contact, the second small-current fixed contact, the first connection circuit and the second connection circuit is a printed wiring pattern formed on the board; and
each of the first large-current fixed contact and the second large-current fixed contact is a conductor plate fixed onto the board.

2. The slide switch as defined in claim 1, which is designed such that, during a course of the movement of the movable contact member, the first large-current movable contact is brought into contact with the first large-current fixed contact before the first small-current movable contact is brought into contact with the first small-current fixed contact.

3. The slide switch as defined in claim 1, which is designed to be interlocked with an operation of moving a shift lever of a shifter mechanism of an automatic transmission vehicle to a parking range position, wherein the movable contact member is adapted to be moved in a manner interlocked with the operation, to allow the first large-current movable contact and the first small-current movable contact to be brought into contact with the first large-current fixed contact and the first small-current fixed contact, respectively.

* * * * *